July 7, 1936.  R. M. BUFFINGTON  2,046,724
SEAL FOR REFRIGERATING APPARATUS
Filed April 5, 1933
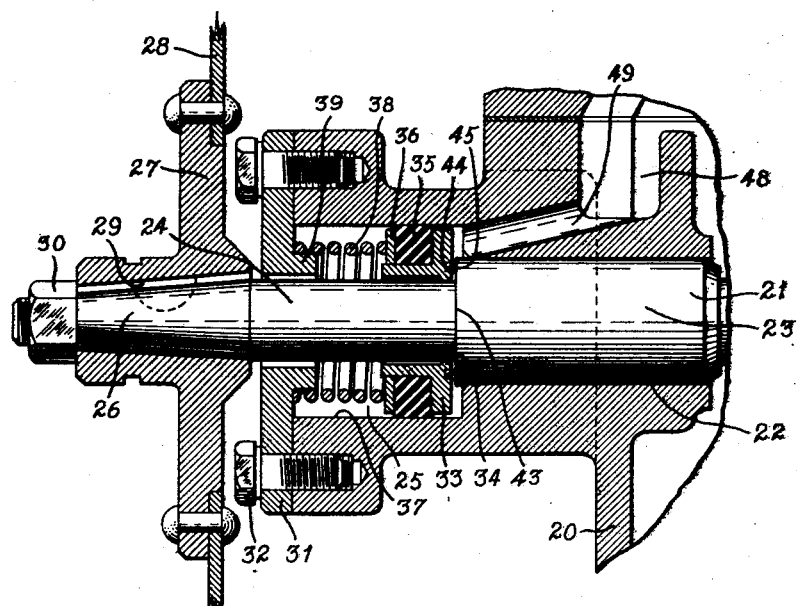
Fig. 1
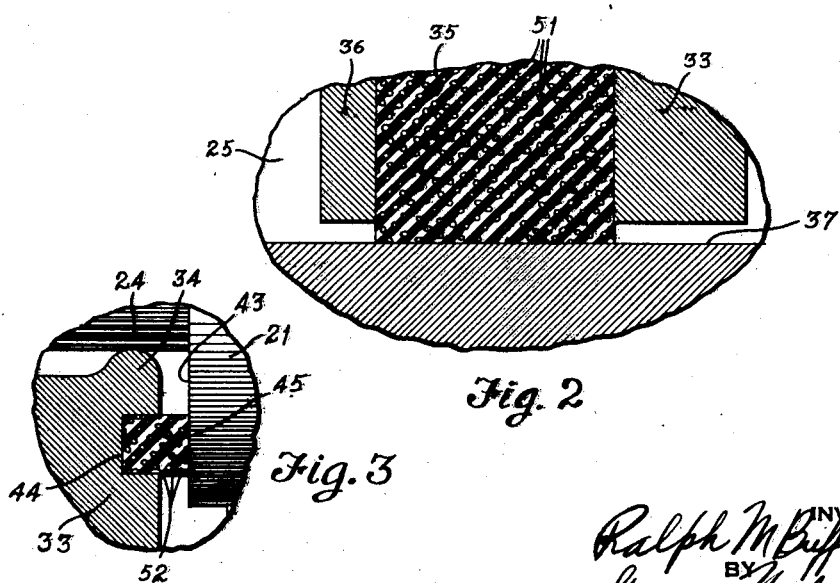
Fig. 2
Fig. 3
INVENTOR
Ralph M Buffington
BY
Spencer Hardman and Fehr
ATTORNEYS Patented July 7, 1936

2,046,724

UNITED STATES PATENT OFFICE 2,046,724

SEAL FOR REFRIGERATING APPARATUS

Ralph M. Buffington, Dayton, Ohio, assignor, by mesne assignments, to General Motors Corporation, a corporation of Delaware Application April 5, 1933, Serial No. 664,582

3 Claims. (Cl. 286—7)

This invention relates to refrigerating apparatus and more particularly to shaft seals for compressors of refrigerating apparatus and pumps.

Recently it has been proposed to provide shaft seals for compressors of refrigerating apparatus which incorporate a rubber-like substance which acts as a seal between the relatively moving parts such as the protruding end of the shaft and the wall of the compressor through which it projects. In such seals it has been customary to cause the rubber-like substance to adhere to one of the metal parts and to cause it to rub against another of the metal parts to provide a sealing engagement. While these rubber-like substances have admirable advantages they have rather high coefficient of friction and are subject to considerable wear.

It is therefore an object of my invention to provide such a seal with such a rubber-like substance so treated that the friction will be reduced and the wearing and sealing properties will be improved.

It is a more specific object of the invention to provide a material exposed upon the contacting surface of the rubber-like substance in such a seal which will have a low coefficient of friction and which will take the wear upon the face of the rubber-like substance.

Further objects and advantages of the present invention will be apparent from the following description, reference being had to the accompanying drawing, wherein a preferred form of the present invention is clearly shown.

In the drawing:

Fig. 1 is a sectional view through a portion of the wall of a refrigerant compressor disclosing the protruding end of the crankshaft and my improved seal;

Fig. 2 is an enlarged sectional view of a portion of the rubber-like stationary sealing means shown in Fig. 1; and Fig. 3 is a fragmentary sectional view of the rubber-like sealing ring in sliding or moving contact with the rotating shoulder of the driving shaft.

Referring to the drawing and more particularly to Fig. 1, there is shown a lower wall 20, a refrigerant compressor or pump having the end of the driving shaft 21 extending through a bearing 22 formed in the wall 20. The bearing portion 23 of the driving shaft 21 extends within the bearing 22 and is provided with an annular shoulder 43 at its outer end. Extending outwardly from the shoulder 43 is a reduced portion 24 of the driving shaft which extends through a seal chamber 25 which is formed by an outwardly protruding extension from the bearing portion 22 of the compressor wall 20. The extreme outer end of the driving shaft 21 has a tapered end 26 provided with a key slot and upon which is mounted the hub 27 of a pulley wheel 28. The hub is held in place by the Woodruff key 29 and a nut 30 threaded upon the end of the driving shaft. The seal chamber 25 is enclosed by the cap 31 which is fastened to the protruding end of the bearing 22 by the plurality of cap screws 32.

Within the seal chamber there is provided a flanged annular ring 33 surrounding the reduced portion 24 of the driving shaft 21. This ring 33 has an inner bearing portion 34 (see Fig. 3) which contacts the reduced portion 24 to hold the ring 33 concentric. This ring in cross section is of a reversed L-shape and has an annular ring of a rubber-like substance 35 mounted within the 90° angle of this reversed L-shaped ring. This rubber-like substance may be of any suitable yielding rubber-like material which will properly withstand the effects of the fluids and gases within the compressor or pump. If water is being pumped, ordinary vulcanized rubber is suitable. If a refrigerant is used, some of the other rubber-like materials, are more suitable, such as synthetic rubber, polymerized chloroprene and its homologs, that is, some of the polymers of chloro-2-butadiene-1,3, commonly known as "Duprene", polymerized isoprene, an isoprene substance, a rubber substitute, or a substance containing ethylene dichloride and sulphur. This annular ring 35 may be vulcanized or cemented to the reversed L-shaped ring, otherwise it may be held in place mechanically by an annular clamping ring 36 which is placed against the opposite side of the annular ring 35 so as to squeeze it against the wall 37 of the seal chamber 25. In order to hold this annular ring 36 in place, it is mounted upon the reduced portion of the ring 33 and is held in place tightly against the side of the rubber-like ring 35 by the coil spring 38 which is held between the ring 36 and a cap member 31 provided with an internal flange 39 for holding the spring 38 concentric with the reduced portion of the driving shaft 21. This spring also holds the reversed L-shaped ring against the shoulder 43.

The ring 33 has a wide flange portion which faces this shoulder 43. This wide flange portion is provided with an annular groove 44 within which is seated an annular ring 45 of a suitable rubber-like substance, such as rubber, polymerized chloroprene and its homologs, synthetic rubber, polymerized isoprene, an isoprene substance, or a substance containing ethylene dichloride and sulphur. Of these materials, polymerized chloroprene and its homologs including some of the polymers of chloro-2-butadiene-1,3, commonly known as "Duprene" are preferred. Such a rubber-like substance may be vulcanized or cemented into the groove or it may be held mechanically within this groove. This annular ring projects from the surface of the ring 33 and contacts the face of the shoulder 43.

According to my invention I so treat this ring 45 that the friction between it and the shoulder 43 is greatly reduced and the wearing and sealing properties are improved. In order to do this I propose to incorporate within this ring a plurality of small solid particles which have a low coefficient of friction both in the presence of oil and when dry and which have good wearing qualities so that these particles, some of which are exposed upon the surface of this annular ring will take the wear while the rubber-like material be largely used as a resilient backing and sealing means. I prefer to use such particles as will be readily vulcanized into the rubber-like substance. Although I prefer to have these particles dispersed throughout the rubber-like substance, they may merely be vulcanized, impregnated, or cemented upon the surface thereof, if desired. These particles may take the form of chemically or electrically deposited silver, preferably in the form of a fine powder which I find is a very good wearing material and has a low coefficient of friction. Other bearing metals and alloys may be used, as well as other solid substances which have good wearing qualities and a low coefficient of friction.

In Fig. 2 the stationary annular rubber-like ring, which seals the space between the wall of the seal chamber 25 and the ring 33, is shown in contact with a portion of the wall 37 of the sealing chamber 25. This stationary annular rubber-like ring is provided with a plurality of fine particles 51 dispersed throughout its mass. These particles may be of any suitable substance, such as chemically deposited silver particles.

In Fig. 3 I have shown an enlarged sectional view of the annular rubber-like sealing ring 45 provided with a plurality of small particles 52 dispersed therein and exposed upon its sealing face which contacts with the shoulder 43. These particles 52 may be of chemically deposited silver in the form of a powder or some other suitable fine particles may be used. These particles take the wear occurring between the relatively moving surfaces and thus reduce the friction and improve the wearing qualities and the sealing qualities of the ring. Thus, these particles carry the friction load while the rubber-like substance still provides adequate sealing.

In order to lubricate the relatively moving sealing surfaces and the bearing 22, I have provided an oil trough or pocket 48 above the bearing 22. This trough is kept filled at all times by the compressor or pump which splashes or pumps lubricant into this trough 48. An oil passage 49 extends from the trough 48 to the face of a ring 33 and thus provides lubrication for the sealing surface. Thus in this type of seal the spring 38 squeezes the ring 35 so that it tightly contacts wall 37 of the sealing chamber 25 as well as the ring 33. This spring also forces the ring 45 into sealing engagement with the shoulder 43 upon a driving shaft. In this way a proper seal is maintained for the protruding end of the driving shaft 21. The ring 35 if desired may also be provided if desired with these solid particles which prevent wear.

Thus it will be seen that I have provided an improved seal having a low friction loss and improved wearing and sealing properties.

While the form of embodiment of the invention as herein disclosed, constitutes a preferred form, it is to be understood that other forms might be adopted, all coming within the scope of the claims which follow.

What is claimed is as follows:

1. A shaft seal including relatively rotating parts and a portion of polymerized chloroprene interposed between and contacting with said relatively rotating parts, said portion having dispersed silver particles imbedded in and exposed upon one of its surfaces, said portion being confined on four sides by said relatively moving parts.

2. A shaft seal including relatively moving parts and a portion of polymerized chloroprene interposed between and contacting with said relatively moving parts, said portion having dispersed silver particles imbedded in and exposed upon one of its surfaces.

3. A shaft seal including relatively moving parts and a portion of flexible, resilient, non-metallic material inert to refrigerants and lubricants interposed between and contacting with said relatively moving parts, said portion having dispersed particles of a material comprising silver imbedded in and exposed upon one of its surfaces.

RALPH M. BUFFINGTON.